US006442568B1

(12) United States Patent
Velasco et al.

(10) Patent No.: US 6,442,568 B1
(45) Date of Patent: Aug. 27, 2002

(54) CUSTOMER INFORMATION CONTROL SYSTEM APPLICATION PROGRAMMING INTERFACE WITH TRANSIENT DATA FUNCTIONS, IN A LOOSELY COUPLED DATA PROCESSING ENVIRONMENT

(75) Inventors: David G. Velasco, Campbell; Andreas E. Hotea, San Jose; Geoffrey A. McDonald, Cupertino, all of CA (US); Robert W. Redd, Roswell, GA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/210,512

(22) Filed: Dec. 11, 1998

(51) Int. Cl.[7] ............................................. G06F 17/00
(52) U.S. Cl. ...................... 707/104.1; 709/310; 707/10
(58) Field of Search ................ 707/1–206; 709/100–332

(56) References Cited

U.S. PATENT DOCUMENTS

| | | | |
|---|---|---|---|
| 5,596,745 A | 1/1997 | Meichen et al. | 707/103 R |
| 5,687,372 A | 11/1997 | Hotea et al. | 707/200 |
| 5,835,905 A | * 11/1998 | Pirolli et al. | 707/3 |
| 5,978,804 A | * 11/1999 | Dietzman | 707/10 |
| 5,978,807 A | * 11/1999 | Mano et al. | 707/10 |

OTHER PUBLICATIONS

Augusiak et al., :"Automated network control and supervision", IEEE Computer Applications in Power, vol. 15, Issue 1, Jan. 2002, pp. 20–2023.*

Qiu et al., "Internet–based SCADA display system", IEEE Computer Applications in Power, vol. 15, Issue 1, Jan. 2002, pp. 14–19.*

(List continued on next page.)

Primary Examiner—David Jung
(74) Attorney, Agent, or Firm—Fenwick & West LLP

(57) ABSTRACT

A customer information control system (CICS) application programming interface (API), with transient data queue functions, in a loosely coupled data processing environment. In accordance with the purpose of the invention, as embodied and broadly described herein, the invention is directed to a method, system and computer readable medium including program instructions (hereafter collectively referred to as the "invention"). In particular, the invention includes implementing a loosely coupled CICS region in a data processing environment, the loosely coupled CICS region including at least two of a plurality of address spaces each of which being associated with a machine. The invention further includes providing at least one CICS-API operating system server (COSS) within the loosely coupled CICS region, each COSS operating in one of the at least two address spaces within the loosely coupled CICS region. The invention additionally includes providing an information resource within the loosely coupled CICS region, the information resource including a file for holding a transient data queue. Furthermore, the invention includes providing a suite of functions including the transient data queue functions in each COSS. Each COSS is capable of coordinated interaction with any other COSS within the loosely coupled CICS region. Notably, each COSS is also capable to directly access the transient data queue from anywhere in the loosely coupled CICS region irrespective of which address space the COSS is operating in. In one aspect of the invention, this COSS capability is achieved by way of implementing a caching scheme and a transient data process which is invoked by the respective COSS. Consequently, there is no affinity between the address space in which each COSS is operating and the address space being occupied by the transient data queue. Moreover, the information resource is shared by each COSS.

61 Claims, 11 Drawing Sheets

OTHER PUBLICATIONS

Toune et al., "Comparative study of modern heuristic algorithms to service restoration in distribution systems", Power Delivery, IEEE Transactions on, vol. 17, Issue 1, Jan. 2002.*

Jim Gray & Andreas Reuter, "Transaction Processing: Concepts and Techniques" Copyright 1993, pp. 255,286, 287, 364, 424, 425, 631, 632, 653, 654, 918–937 and 973, ISBN 1–55860–190–2, QA76.545.G73 1993, Morgan Kaufmann Publishers, Inc.

Yukihisa Kageyama, "CICS Handbook" Copyright 1989, including Contents and Introduction to CICS, Chapter 1, pp. 1–33, Intertext Publications, McGraw–Hill Book Company, New York.

John Kneiling et al., "Understanding CICS Internals" Copyright 1992, including Contents, Database Management, pp. 157–172, and Transient Data, pp. 209–219, McGraw–Hill, Inc.

IBM Corporation, "CICS/ESA Programming Guide" Version 3, Release 3, Third Edition (Mar. 1992), Copyright 1992, including Contents and pp. 299–342.

* cited by examiner

CUSTOMER INFORMATION CONTROL SYSTEM APPLICATION PROGRAMMING INTERFACE WITH TRANSIENT DATA FUNCTIONS, IN A LOOSELY COUPLED DATA PROCESSING ENVIRONMENT

FIELD OF THE INVENTION

This application relates to information control systems and, specifically, to customer information control systems and methods with transient data functionality in a loosely coupled data processing environment.

BACKGROUND OF THE INVENTION

Data processing application programs, including information control applications and, more particularly, customer information control applications, access and manipulate various data resources such as customer databases, print queues and display queues. Data resources are frequently accessed through an application programming interface (API) which typically provides a transparent connection between the data processing applications and their respective data resources.

Customer information control applications regularly utilize an application programming interface (API) known as the Customer Information Control System (CICS) API, which was created by the IBM Corporation, Armonk, N.Y. CICS is a trademark of the IBM Corporation.

CICS is multithreaded software running as an on-line feature in a multitasking machine environment. CICS generally runs under the operating system as a high priority program that handles requests from application programs by building tasks to execute transactions invoked at a terminal during run-time of the application programs. In other words, CICS positions itself between the operating system and the application programs with the essential role of providing a suite of control and services functions that serve as an interface between the application programs and the operating system. Application programs, in turn, are developed for implementing the CICS services, by linking the CICS services with the application programs via, for example, a program library, to form customer information database and/or data communication systems.

Hence, CICS provides a suite of functions for realizing the interface between such customer information control applications and their respective customer database or other system and data resources. The suite of CICS functions may be fashioned as a software package in a conventional CICS process server (CPS).

In a conventional data processing machine having a multithreaded operating system, multiple concurrent data processing applications can be supported. Consequently, running under the multithreaded operating system, the CPS, which is itself a multithreaded operating system, supports multiple concurrent customer information control applications, providing them its suite of CICS functions. The functionality of this data processing machine is associated with an address region being divided among its memory devices, including one or more of main memory, cache memory and virtual memory, and including a physical address space and a logical address space.

Moreover, within the address region of this data processing machine, more then one conventional CPS can reside. Each conventional CPS is capable of communicating with another CPS in the data processing machine. Each such conventional CPS defines a distinct CICS region which occupies a segment of the address region. Further, each conventional CPS provides its suite of CICS functions to a particular group of concurrent customer information control applications for interfacing with their respective data resource within their CICS region.

However, one conventional CPS cannot provide a direct interface to data resources within the CICS region of another CPS in this machine. As a result, one customer information control application in one CICS region cannot encroach directly on the respective data resource of a second customer information control application in a different CICS region. Rather, a communication path must first be established from one CPS to the next CPS for transferring, accessing and manipulating information.

In a data processing environment, more than one data processing machine can participate. Hence, one or more of the above described conventional data processing machines can form and participate in a data processing environment. Each of these machines may include one or more than one distinct CICS region. However, as mentioned, one conventional CPS cannot directly interface with data resources in the CICS region of a second conventional CPS. Hence, within this conventional data processing environment, interface with data resources on different data processing machines also cannot be direct.

As a result, such data processing environments are inflexible. Furthermore, since the functionality of each machine is typically managed by a processor, various processes including one or more customer information control applications and, in turn, one or more conventional CPSs compete for processor attention. Namely, all of the above processes contend for instruction cycles of the processor.

Hence, a need exists for a more flexible data processing environment. A need further exists for a data processing environment in which data resources sharing is not hindered by cumbersome mechanisms. The present invention addresses this and related purposes.

SUMMARY OF THE INVENTION

A preferred embodiment of the present invention provides a customer information control system (CICS) application programming interface (API), with transient data queue functions, in a loosely coupled data processing environment. In accordance with the purpose of the invention, as embodied and broadly described herein, the invention is directed to a method, system and computer readable medium including program instructions (hereafter collectively referred to as "the invention").

In particular, the invention includes providing a loosely coupled CICS region in a data processing environment. The loosely coupled CICS region includes at least two of a plurality of address spaces each of which being associated with at least one machine.

The invention further includes providing a suite of functions, including the transient data queue functions, as a package in at least one CICS-API operating system server (COSS) within the loosely coupled CICS region. Each COSS operates in one of the at least two address spaces within the loosely coupled CICS region, and each COSS is capable of coordinated interaction with any other COSS within the loosely coupled CICS region.

Additionally, the invention includes providing an information resource within the loosely coupled CICS region, the information resource including a file for holding a transient data queue. Each COSS is capable to directly access the transient data queue from anywhere in the loosely coupled CICS region irrespective of which address space the COSS is operating in. In one aspect of the invention, this COSS capability is achieved by way of implementing a caching scheme and a transient data process which is invoked by the respective COSS.

Consequently, there is no affinity between the address space in which each COSS is operating and the address space being occupied by the transient data queue. Moreover, the information resource is shared by each COSS.

BRIEF DESCRIPTION OF THE DRAWINGS

The accompanying drawings, which are incorporated in and constitute a part of this specification, illustrate the preferred embodiment of the invention and, together with the description, serve to explain the principles of the invention.

DETAILED DESCRIPTION OF A PREFERRED EMBODIMENT

The present invention as hereafter described, provides a Customer Information Control System (CICS) application programming interface (API), with transient data functions, in a loosely coupled data processing system environment. The invention enables data processing applications, developed to use the CICS control and services functions, to perform transactions which can access and manipulate customer information resources from any address space irrespective of which address spaces the customer information resources are stored in. As a result the loosely coupled data processing system environment is flexible and easier to manage.

Reference will now by made in detail to a preferred embodiment of the invention which is illustrated in the accompanying drawings. Wherever convenient, the same reference numbers will be used throughout the drawings to refer to the same or like parts.

A. The Loosely Coupled Data Processing System Environment

Figure 1:
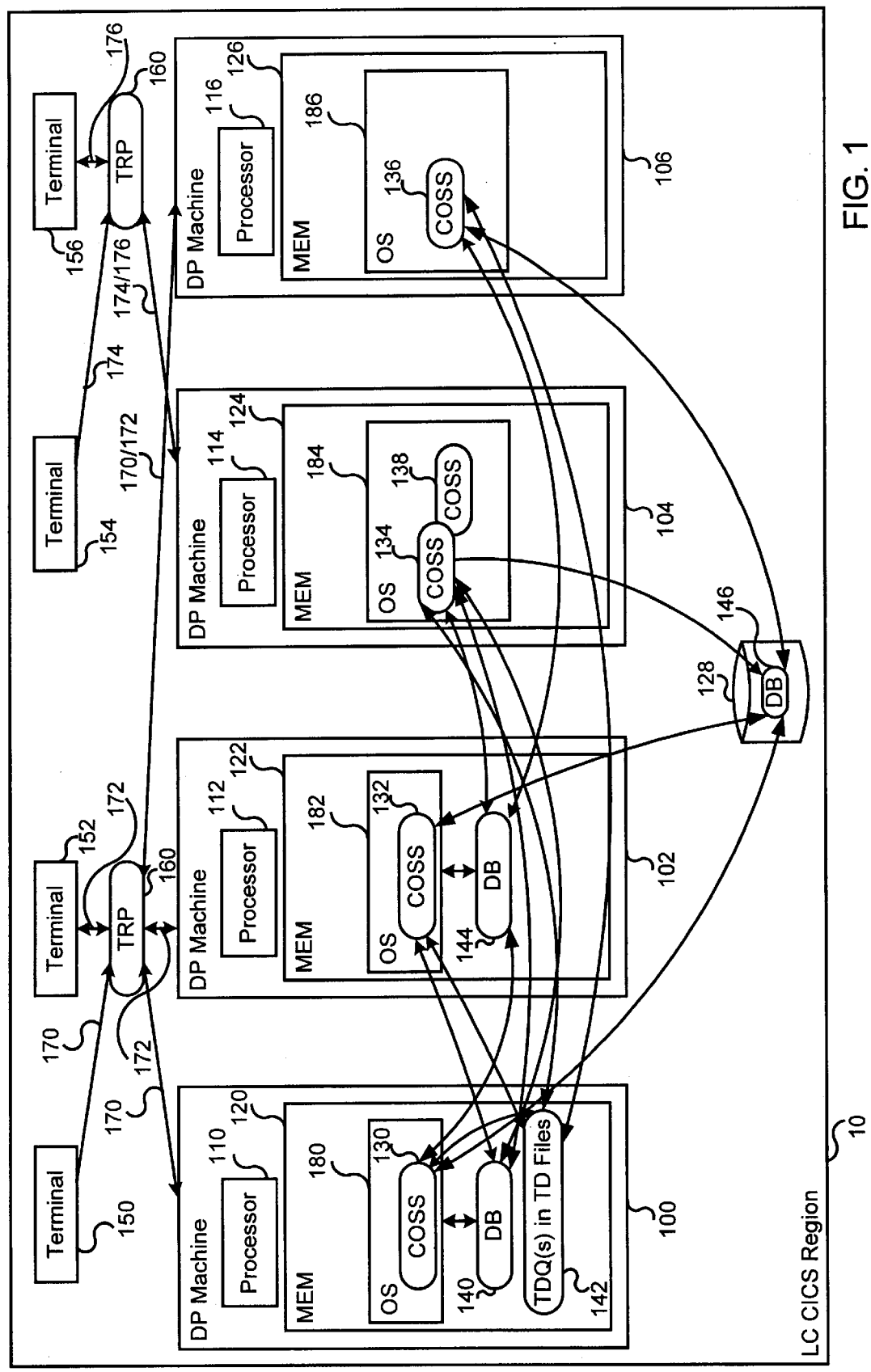
FIG. 1 shows an example of a loosely coupled data processing system in which an embodiment of the present invention can be implemented.

A preferred embodiment of the invention, as hereafter described, provides a Customer Information Control System (CICS) application programming interface (API), with transient data functions, in a loosely coupled data processing system environment. The preferred embodiment of the loosely coupled data processing system environment in accordance with the present invention is illustrated in FIG. 1. The data processing system includes at least one data processing machine 100, 102, 104 and/or 106. The functionality of each data processing machine 100, 102, 104 and 106, is managed by a respective processor 110, 112, 114 and 116, and is associated with an address space being divided among its memory devices 120, 122, 124, 126 and 128, including one or more of main memory, cache memory (for example, memory 120, 122, 124 and 126) and virtual memory 128. The address space of a data processing machine 100, 102, 104 and 106 typically includes a physical address space and a logical address space. Moreover, the functionality of each data processing machine includes a multithreaded operating system 180, 182, 184 and 186, which supports multiple concurrent data processing applications.

In this environment, a suite of functions including the CICS control and service functions with transient data queue functions is furnished in a CICS-API operating system server (hereafter COSS) 130, 132, 134, 136, and 138. Each COSS runs under the respective multithreaded operating system 180, 182, 184 and 186. Each COSS 130, 132, 134, 136 and 138 is in itself a multithreaded operating system. Consequently, each COSS 130, 132, 134, 136 and 138 supports multiple concurrent customer information control applications, providing them its suite of functions. Namely, each COSS provides to respective application programs a transparent interface to data resources, such as customer information resources. A customer information resource contains, for example, a customer information database and a transient customer data queue.

In operation, system management and user interface functions are provided via terminals 150, 152, 154 and 156. User commands in the form of transaction requests are preferably routed through a terminal routing process (TRP) 160, which is a multithreaded process mapping a screen menu and responding to the selection of menu items on the terminals 150, 152, 154 and 156.

The CICS region 10 in accordance with the invention, being loosely coupled, is spread among one or more than one loosely coupled data processing machine 100, 102, 104 and 106 and the CICS functionality is provided in more than one COSS 130, 132, 134, 136 and 138. With this configuration, each data processing machine 100, 102, 104 and/or 106 may have one or more COSS 130, 132, 134, 136 and 138 in its address space. As illustrated, the CICS region 10 in this environment is divided among the several data processing machines 100, 102, 104 and 106, although it maintains the appearance of a single undivided CICS region to data processing applications that access it. Hence, with the foregoing configuration the CICS region 10 is a loosely coupled CICS (LC-CICS) region.

A person of ordinary skill in the relevant art should readily appreciate that, although in the illustrated configuration the groups of COSSs 130, 132, 134 and 138, and 136 reside in the respective memory 120, 122, 124 and 126 of the data processing machines 100, 102, 104 and 106, other configurations may be used without departing from the scope and spirit of the present invention. For example, multiple COSSs can reside in main or virtual memory 120, 122, 124, 126 and 128 in some or all of the data processing machines 100, 102, 104 and 106. It should be further noted that, preferably, each LC-CICS region, e.g., 10, operates as an autonomous data processing environment with its own resources, although sharing of resources—e.g., databases and queues—among different LC-CICS regions is technically possible, for example, by way of inter-region communications.

Additionally, the customer information resource within the LC-CICS region 10 may reside in the address region of any participating data processing machine 100, 102, 104 or 106 or it may be divided among several participating data processing machines 100, 102, 106 and/or 104 (as shown). Whether located in main or cache memory 120, 122, 124 and 126 of any data processing machine 100, 102, 104, and/or 106, or in one or more virtual memory devices 128, the entire customer information resource—including, the customer information databases 140, 144, and 146 as well as one or more transient customer data queues in a transient data file 142—may be accessible from any data processing machine 100, 102, 104 or 106, by any COSS 130, 132, 134, 136 or 138.

Also in this environment, one COSS 130, 132, 134, 136 or 138 communicates with another COSS 130, 132, 134, 136 or 138 in the same CICS region 10, even across the different, loosely coupled data processing machines 100, 102, 104 and 106. And, through data resources sharing, every COSS 130, 132, 134, 136 and 138 can directly interface with the customer information resource irrespective of its locations within the LC-CICS region 10. Hence, each COSS 130, 132, 134, 136 and 138 can access the shared customer information resource from anywhere within the LC-CICS region 10.

Moreover, to render the LC-CICS region 10 most effective, the inter-COSS communication and the customer information resource sharing are coordinated. Preferably, the COSSs 130, 132, 134, 136 and 138 in the LC-CICS region 10 are capable of synchronous interaction with each other.

As a result, concurrent customer information control applications responding to transaction requests within the LC-CICS region 10 can be transparently interfaced with the customer information resource through any available COSS 130, 132, 134, 136, or 138. Furthermore, in this environment, transaction requests from one or more terminals 150, 152, 154 or 156 participating in any of the customer information control applications can be routed (and even re-routed if the path 170, 172, 174, or 176 first used fails) to any part of the customer information resource through any COSS 130, 132, 134, 136 or 138 in the LC-CICS region 10.

Routing and initiating a transaction request based on the location of the customer information resource relative to the location of the COSS or its address space usage is known as transactions affinity. Conventional data processing system environments are characterized by a strong affinity since each COSS defines a distinct CICS region associated with its own address space which cannot be directly invaded by another COSS. Namely, each conventional COSS can provide a direct interface only to a data resource within its address space.

Advantageously, the present invention eliminates this affinity and, thereby, provides the loosely coupled data processing system environment as described above. Furthermore, in this loosely coupled data processing system environment the workload and system resources are spread among the loosely coupled data processing machines 100, 102, 104 and 106 and over their collective address space. Hence, this environment is flexible and easily implemented and managed.

The above described environment enables transactions to access and manipulate, through the suite of functions, transient data queues—such as, transient sequentially grouped customer records (hereafter referred to as "transient data queues")—from any address space in the loosely coupled data processing system environment. This system environment may be, for example, a parallel processing system for providing parallel transaction processing (PTP) services for the CICS-API.

More specifically, transaction requests are able to prompt reading, writing or deleting of transient data queues in any address space via any COSS 130, 132, 134, 136 or 138 within the LC-CICS region 10. The transient data queues are often, but not exclusively, used as printer queues for batch processing of print jobs.

Figure 2:
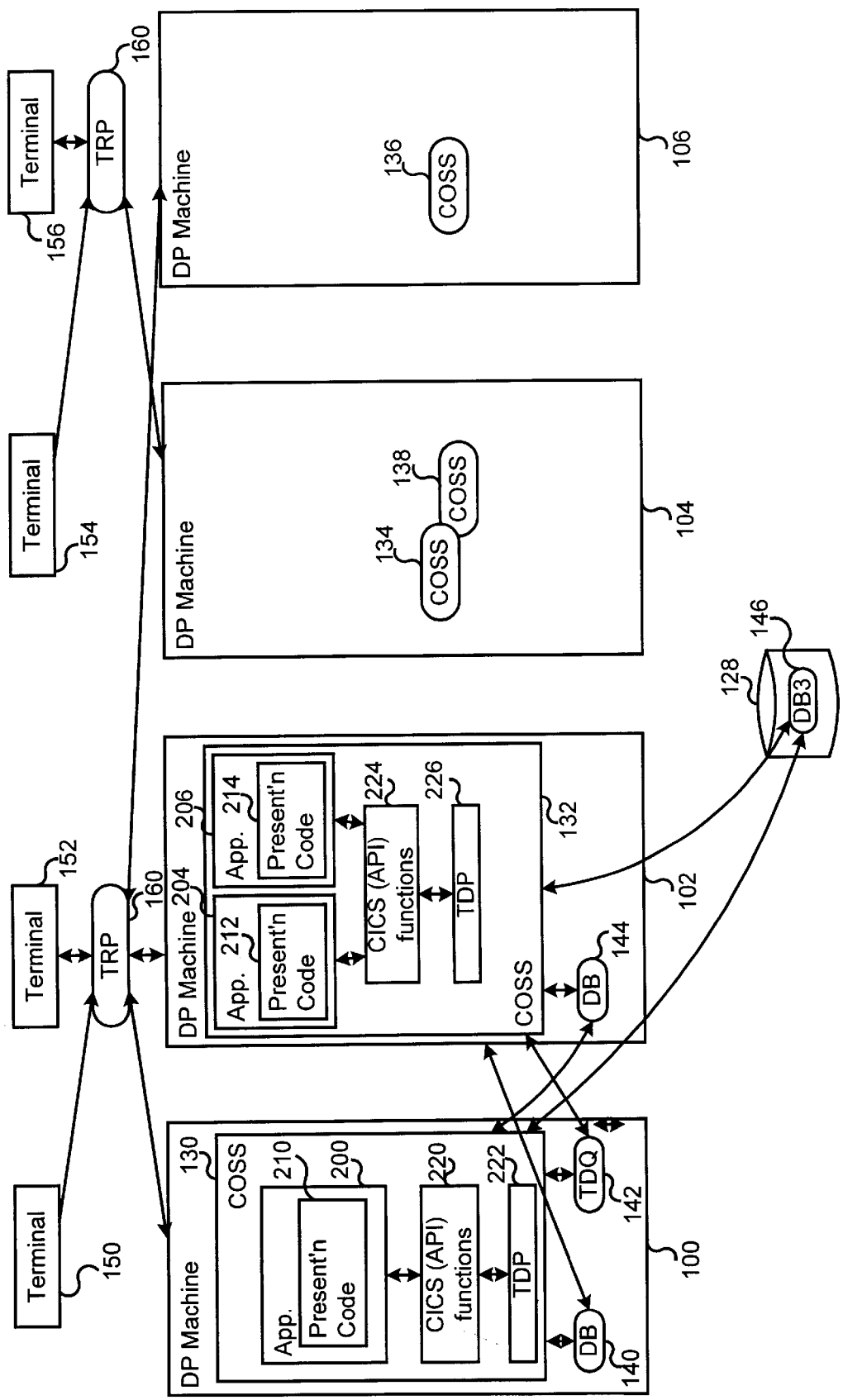
FIG. 2 illustrates a loosely coupled customer information control (CICS) region with two CICS-API (application programming interface) operating system servers (COSS) in separate data processing machines being active.

FIG. 2 illustrates the LC-CICS region 10 with two of the COSSs 130 and 132 in data processing machines 100 and 102 being active and responding to transaction requests. As mentioned before, the suite of functions which are fashioned in each COSS 130, 132, 134, 136 and 138, include the CICS control and service functions with the transient data queue functions.

Application programs invoke these functions by way of function calls. The function calls are collectively labeled as executive CICS (EXEC-CICS) calls. Function calls specifically addressing transient data queues are labeled collectively as executive CICS transient data queue (EXEC-CICS-TDQ) calls. All EXEC-CICS calls including the EXEC-CICS-TDQ calls, pass parameters for determining the proper function to be executed based upon the type of transaction requested. EXEC-CICS-TDQ calls invoke functions including read queue, write queue and delete queue.

Each COSS, e.g., 130 and 132, supports one or more customer information control application 200, 204 and 206, respectively. A transaction request from one of the terminals 150 or 152, can be routed, via the terminal routing process 160, to an available COSS, e.g., 130 or 132 in either one of the participating data processing machines 100 or 102. The assigned COSS 130 or 132 then handles the transaction request by providing the interface to the transient data queue 142 or one of the databases 140, 144 or 146 from the respective customer information control application 200, 204, or 206 which is, in turn, responsive to a selected display field presentation code 210, 212, or 214.

In the preferred embodiment, a suit of functions is provided as a package in each COSS, including CICS-API functions, which are compatible with the CICS functions by the IBM Corporation. The CICS-API functions are fashioned in each COSS 130, 132, 134, 136 and 138, in the respective API 220 and 224. In addition, each COSS functionality includes and is capable of invoking one or more transient data processes (TDP) 222 and 226. It is noted that each COSS in this environment has the foregoing functionality, even if not shown (since only the active COSSs are illustrated in detail).

A TDP 222 and 226 is a special software process for handling EXEC-CICS-TDQ function calls in a LC-CICS region, e.g., 10, in accordance with the invention. The TDP 222 and 226 employs a scheme, preferably a caching scheme, suitable for the loosely coupled data processing environment of the loosely coupled CICS region 10.

A TDP 222 and 226 is initiated in response to a first transaction request and is subsequently invoked each time a new transaction request is instituted. When more than one transaction request is directed to a respective customer information control application 200, 204 or 206 running under a corresponding COSS 130 or 132, more than one TDP is initiated by this COSS 130 or 132. If every previously initiated TDP 222 and 226 is already busy, this COSS initiates a new TDP (not shown).

Figure 3:
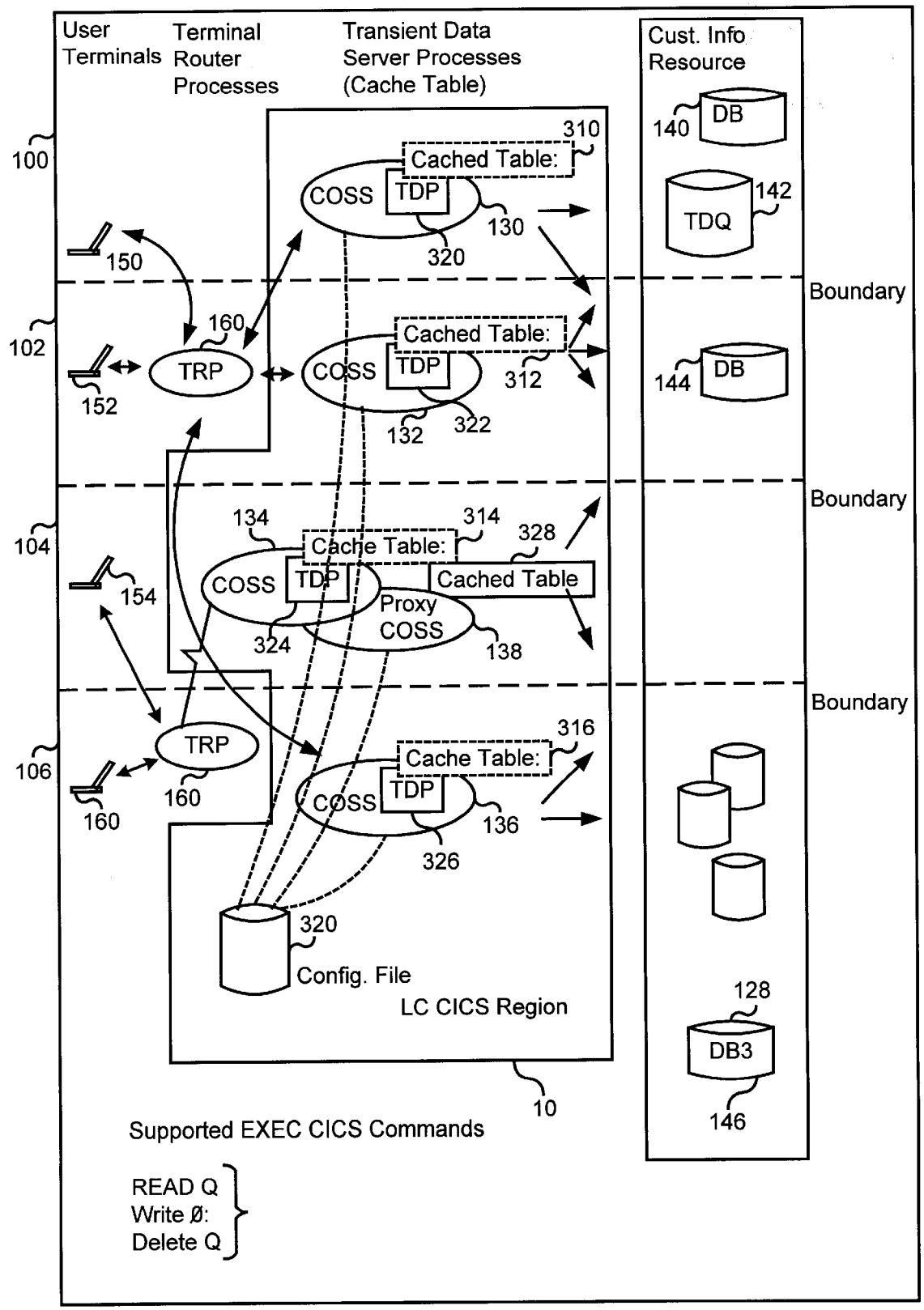
FIG. 3 illustrates a loosely coupled CICS region with a plurality of transient data processes (TDPs) already initiated.

FIG. 3 further illustrates the preferred embodiment with a plurality of TDPs 320, 322, 324 and 326 already initiated. As before, each data processing machine 100, 102, 104 and 106 includes in its address space at least one COSS 130, 132, 134, and 138, and 136, respectively. Transaction requests are routed from the terminals 152, 154 and 156 via the terminal routing process 160. Through a selected COSS 130, 132, 134 or 136, interface is provided to transient data queue(s) in transient data file(s) 142 and one of the customer information databases 140, 144 and 146. The selected COSS initiates or, if already initiated, invokes the corresponding TDP 320, 322, 324 or 326. A proxy-COSS 138 is included for maintaining global parameters of the LC-CICS region 10 as will be further explained herein below.

As part of the preferred interface implementation, the caching scheme is implemented with cached tables 310, 312, 314, 316 and 318. The cached tables 310, 312, 314, 316 and 318 includes LC-CICS region parameters as well as transient data queue locations within the LC-CICS region 10 and related information. The cached tables 310, 312, 314, 316 and 318 are used by the respective TDP 320, 322, 324 and 326. The memory space for the cached tables 310, 312, 314, 316 and 318 is allocated during COSS 130, 132, 134, 136 and 138 initialization. The caching scheme advantageously facilitate the flexibility of the loosely coupled data processing environment in that it allows easy tracking of a transient data queue from anywhere within the LC-CICS region 10, whether the file 142 holding it is stationary or dynamically relocated.

B. Initialization of the Loosely Coupled Data Processing System Environment

Figure 4:
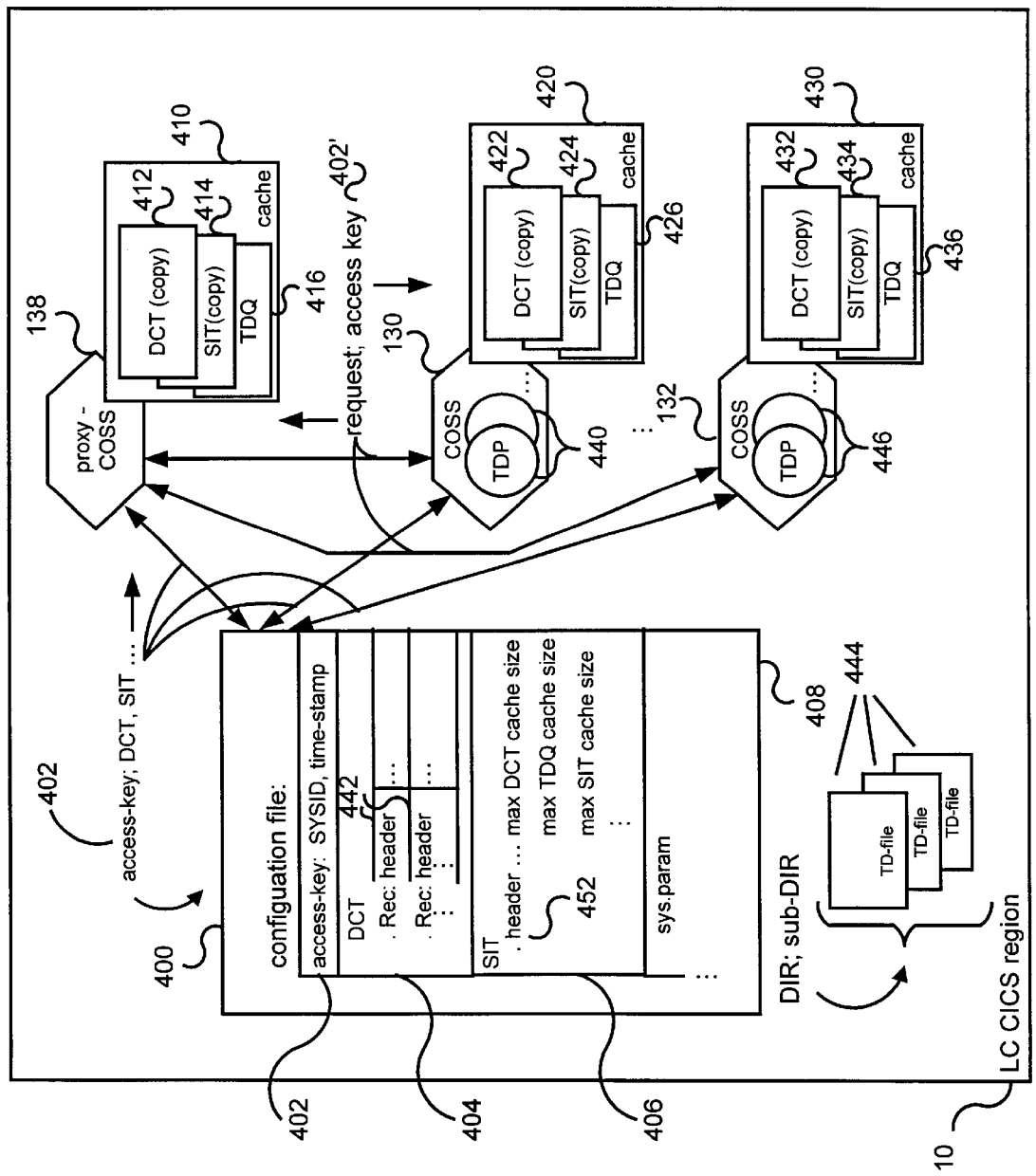
FIG. 4 illustrates the initialization process of the loosely coupled data processing system environment.

Before the loosely coupled data processing system environment can begin handling transaction requests, the system must first be initialized. FIG. 4 describes the initialization process of the loosely coupled data processing system environment.

The metes and bounds of the loosely coupled data processing system environment, particularly the LC-CICS region 10, are set as parameters stored, for example, in a system configuration database, system configuration file or resource definition file (hereafter referred to as the "configuration file") 400. The configuration file 400 includes definitions of CICS region parameters in the form of tables such as a destination control table (DCT) 404, a system initialization table (SIT) 406, as well as a configuration file information access key (hereafter referred to as the "access key") 402. The access key 402 includes information such as an associated time-stamp and a LC-CICS region identification labeled as region-ID (and also known as SYSID). It should be understood that the labels mentioned herein above and below are exemplary and that any alternative labels may be suitably used for the various parameters.

As illustrated, the LC-CICS region 10 may include one or more than one file called transient data file (TD-file) 444 for holding the transient data queues. The TD-files 444 are pre-defined by the respective customer information control applications. When each TD-file 444 is subsequently opened by one of these applications, a corresponding file handle (not shown) is returned for allowing future access to the particular file. A TD-file 444 holding more than one transient data queue is opened a number of times, once for each transient data queue. Hence, each transient data queue is associated with a file handle when the corresponding file is subsequently opened.

Notably, a TD-file 444 may be dynamically allocated, resized and reallocated in any address space within the LC-CICS region. When a TD-file 444 is initialized, address space and time-stamp information (e.g. time-stamp 614)is created (additional information may also be included). The time-stamp information is subsequently used by the TDPs 320 or 322 to determine whether the TD-file 444 has been relocated.

Figure 5:
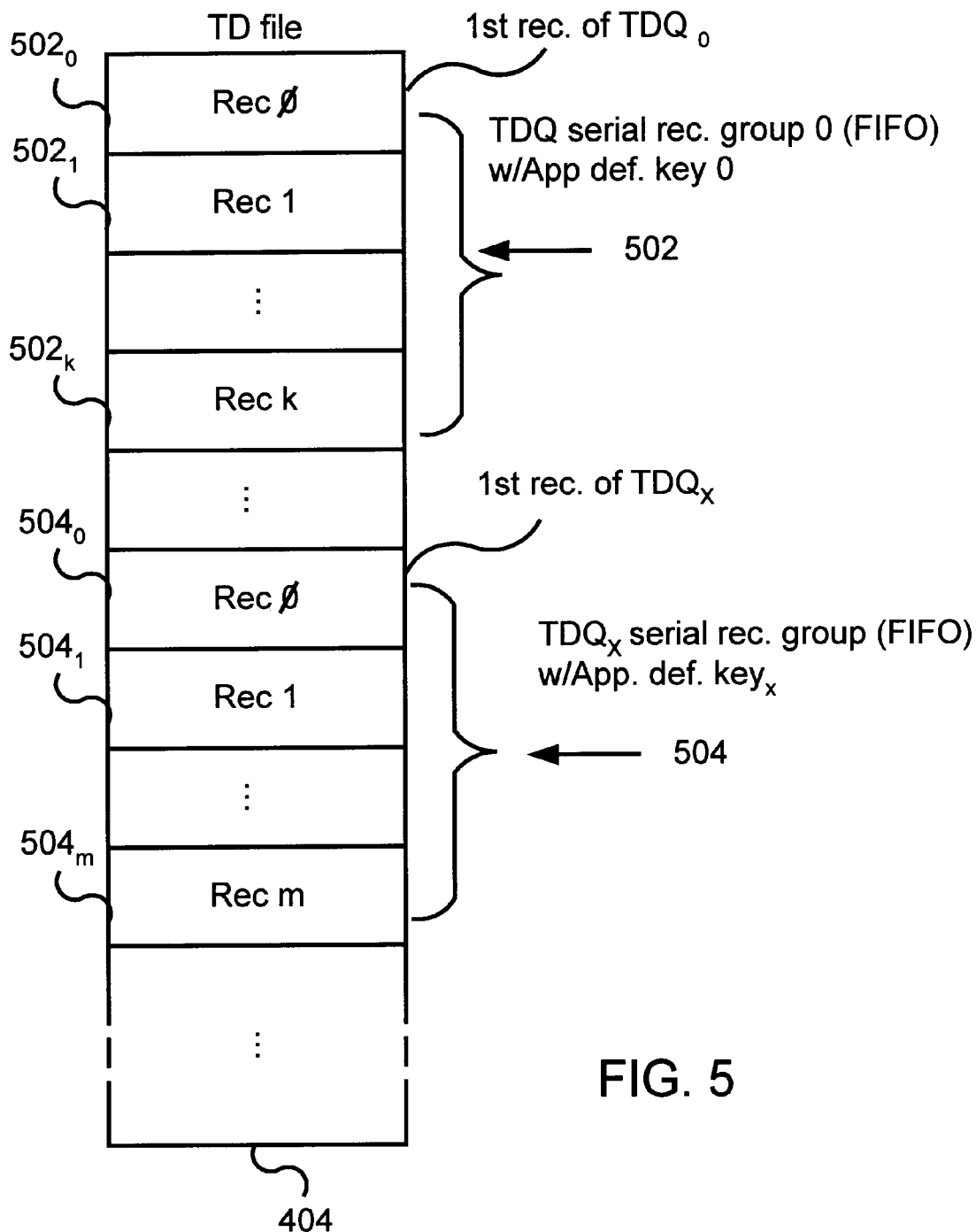
FIG. 5 is a presentation of the preferred structure of a transient data (TD) file.

FIG. 5 provides a representation of the preferred structure of each TD-file 444. As illustrated, each TD-file 444 is capable of holding one or more transient data queues containing, for example, transient customer information to be printed. Each transient data queues is a sequential group of commonly named record entries 502 or 504. For example, the first group, $group_0$ includes k record entries $502_0$–$502_{k-1}$ and $group_x$ includes m record entries $504_0$–$504_{m-1}$. As here implemented, the name associated with the entries in a particular transient data queue is a unique key, TDQ-ID, defined by a related customer information control application. A particular transient data queue is created when the first record entry $502_0$ or $504_0$ is written to the TD-file 444; and removed when the transient data queue becomes empty. In this instance the transient data queue is, but is not required to be, of the first-in-first-out (FIFO) type.

Referring back to FIG. 4 for a further description of the initialization process. The first to be initialized is the proxy-COSS 138. The proxy-COSS 138 is a specialized COSS which maintains, in a globally known address space, the global values of the LC-CICS region. Communication between the globally known proxy-COSS address space and other COSSs 130, 132, 134 and 136 can be performed via globally known input/output (I/O) messages or other means, wherein the proxy-COSS 138 responds to messages addressed to it.

Preferably, the proxy-COSS 138 is a pair (not shown) of a primary proxy-COSS and a backup proxy-COSS which takes over when the primary proxy-COSS fails. To that end, during operation the backup proxy-COSS receives checkpoints from the primary proxy-COSS, including configuration updates indicating the fitness or failure of the primary proxy-COSS. The backup proxy-COSS also updates its internal tables in accordance with these checkpoints.

To facilitate the above-mentioned caching scheme, the proxy-COSS 138 preferably allocates space in it internal cache memory 410 for a copy 412 and 414 of each of the above-mentioned tables in the configuration file 400 and for a transient data queue parameters table (hereafter referred to as the "TDQ cached table") 416. Thereafter, the proxy-COSS 138 copies into its allocated internal cache 410 the information from the configuration file 400 including the DCT 404 and SIT 406.

As here implemented, the configuration file 400 provides a header section 442 which is included in every configuration table entry including in the DCT 404 and SIT 406. The DCT 404 includes entries (hereafter referred to as "DCT records") 610 as shown in FIG. 6.

Figure 6:
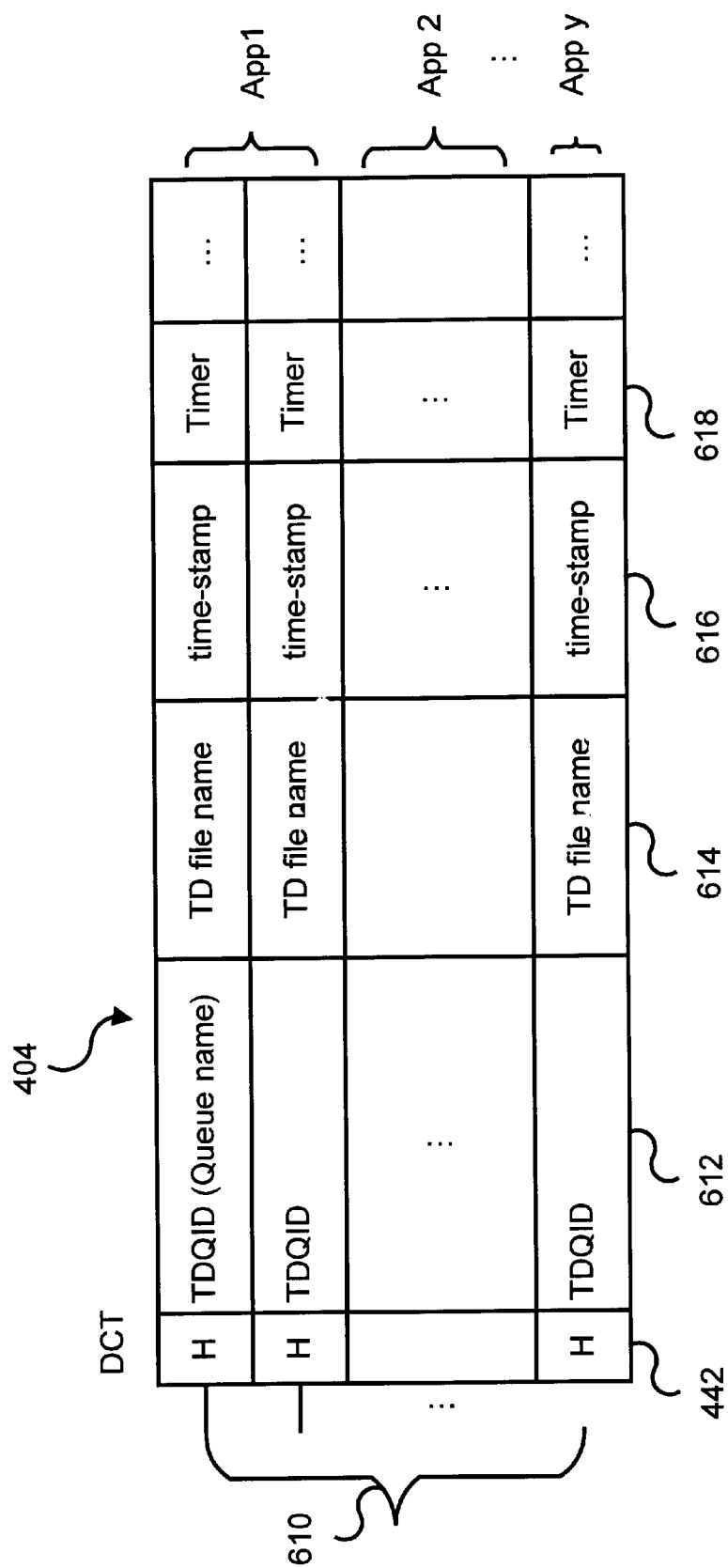
FIG. 6 describes the destination control table records structure.

FIG. 6 illustrates the destination control table records structure. For each TDQ-ID 612, there is one DCT-record which, in addition to the header 442, also includes fields of related information such as a corresponding TD-file name 614 and a file creation time-stamp 616. The time-stamp 616 is issued when the proxy-COSS 138 creates a TD-file with the particular file name 614 (as defined by a customer information control application).

Moreover, with reference to the SIT 406 in FIG. 4, in addition to the header 452, the SIT 406 includes the maximum size value of the various cached tables 412, 414, 416, 422, 424, 426, 432, 434 and 436, respectively, in each COSS 130, 132, 134, 136 and 138. These values describe an upper limit for the amount of internal cache memory space being allocated by the corresponding COSS 130, 132, 134, 136 and 138 for each of the cached tables 412, 414, 416, 422, 424, 426, 432, 434 and 436, respectively. Generally, the maximum size values for the TDQ cached tables 416, 426 and 436, are smaller than an anticipated maximum size capable of storing, simultaneously, the information corresponding to all the transient data queues. As a result, when any TDQ cached table 416, 426 and 436 becomes full during runtime, before new entries are inserted, a least recently used (LRU) algorithm is preferably used to remove stale entries from it.

Once the proxy-COSS initialization is complete, all other COSSs 130 and 132 are initialized. It should be understood that the number of COSSs is not limited to those illustrated in FIGS. 14, although, for simplicity, only several are shown.

As shown in FIG. 4, each remaining COSS 130 and 132 allocates space in its internal cache memory 420 and 430 for the respective cached tables 422 and 432, 424 and 434, and 426 and 436. Thereafter, each such COSS 130 and 132, in its turn, requests then waits for a message from the proxy-COSS 138 containing an access key 402'. Using this access key 402', each COSS 130 and 132 gains access to the configuration file 400 by validating it against the configuration file access key information 402. By gaining access to the configuration file 400, each COSS 130 and 132 can access the DCT 404, SIT 406, and other control information lists, if applicable, within the configuration file 400 in order to copy their contents into the COSS's internal cache memory space 420 and 430. Each COST 130 and 132 maintains a cached copy of DCT 404 and SIT 406 for expedited processing. The respective TDQ cached tables 416, 426 and 536, receive a header (not shown here) which includes the region-ID (SYSID), a CICS release version and a time-stamp as in the DCT-records header. Otherwise, the TDQ cached tables 416, 426 and 436 remain empty until commencement of their construction, along with the initiation of a TDP 440 or 446, is prompted during runtime by a first transaction request to the particular COSS 130 and 132.

A failure to gain access to the configuration file 400 occurs when there is a mismatch between the access key 402' and the configuration file access key 402. This failure results in the COSS 130 or 132 requesting an alternate access key 402' from the proxy-COSS 138.

After COSS initialization is complete, each COSS 130, 132, 134 and 136 will become dormant until awaken by a transaction request from one of the customer information control applications or, alternatively, by a prompt from the proxy-COSS 138 or from one of the terminals via the terminal routing process 160. When active, a COSS 130 or 132 initiates a TDP 320 or 322 and loads the cached table 310 and 312 with transient data queue parameters (hereafter referred to as "queue parameters") as further explained herein below.

Figure 7A:
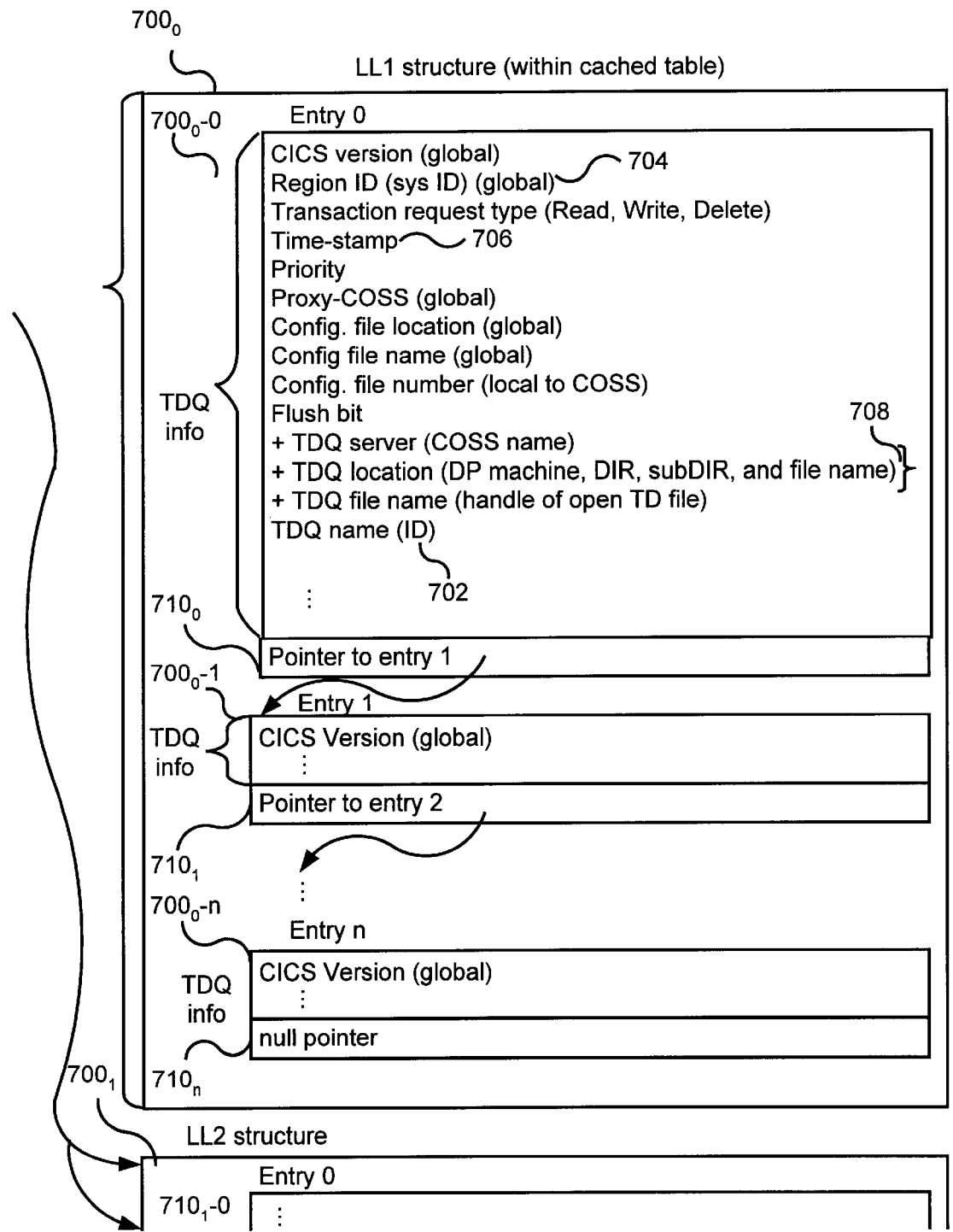
FIGS. 7A and 7B are an illustration of the structure and contents of, and an access method to, a transient data cached table.
Figure 7B:
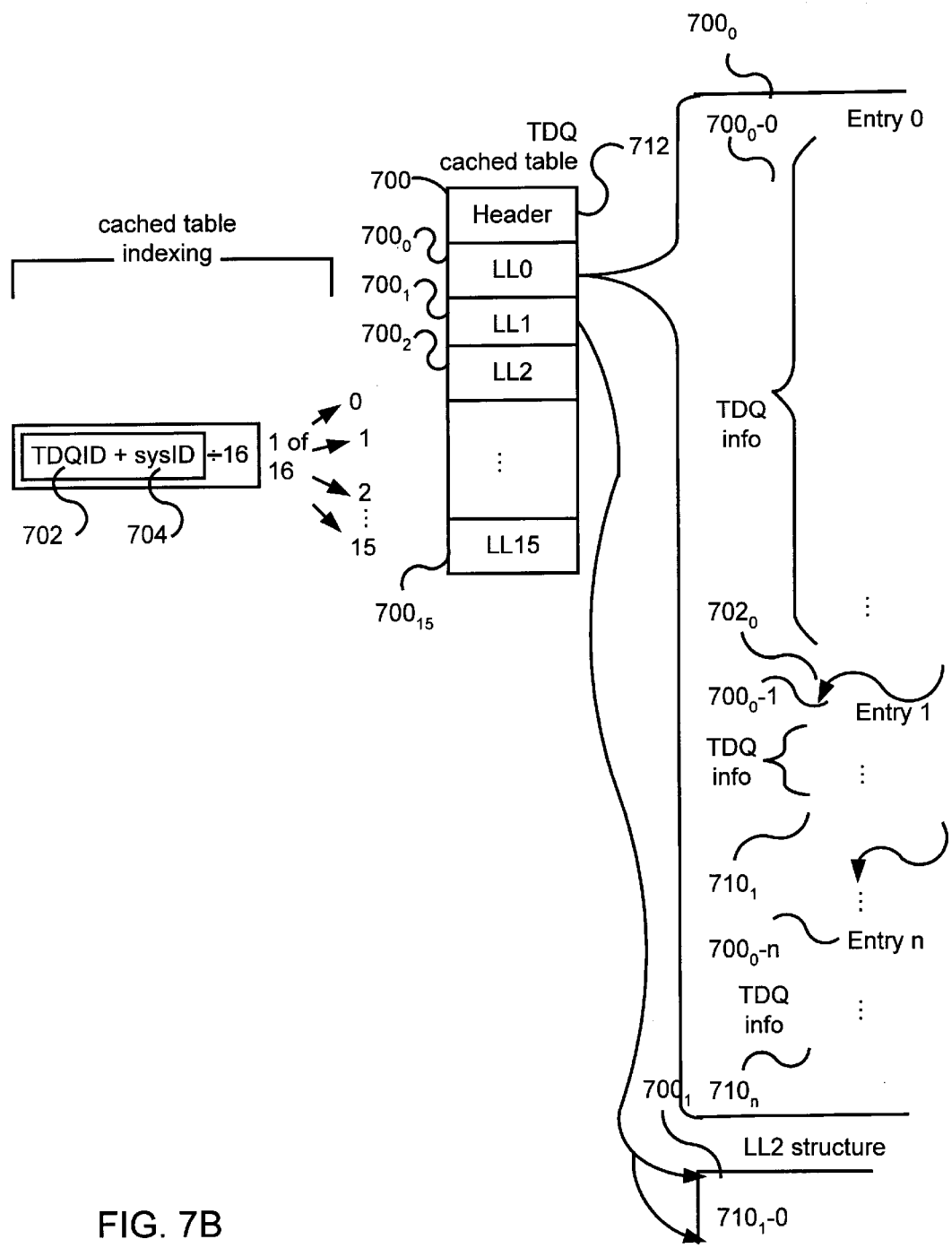

FIGS. 7A and 7B provides a more detailed description of the structure and contents 700 of the TDQ cached tables 416, 426 and 436 (hereafter collectively referred to with the designation number 700). As mentioned before, the maximum size of the TDQ cached tables 700 is fetched from the SIT and this amount of memory is allocated for them during initialization. Each cache table receives a header 712 which, similar to the DCT header, includes a time-stamp. At the end of their initialization, the cached tables 700 contain the header 712 and otherwise are empty and ready to receive the queue parameters.

Every one of the TDQ cached tables 700 is preferably set up to include one or more linked lists $700_{0, 1, ...}$ for containing the queue parameters. The efficiency of a search for queue parameters increases if a plurality of linked lists is used rather than one. In this instance every cached table 700 is set up to include 16 linked lists $700_{0, 1, ... 15}$.

As noted before, each transient data queue is a sequential group of commonly named entries, where each entry is typically one or more customer records (hereafter referred to as "record entry"). Each record entry is associated with a set of queue parameters to be stored as one element in a respective linked list $700_{0, 1, ...}$. Each of the linked lists $700_{0, 1, ...}$ is typically set up to include a plurality of elements $700_{0, 1, ...}$,-0, 1, ..., wherein every element is linked to the next element through a pointer $710_{0, 1, ...}$. For example, the first linked list is set up to include element $700_0$-0 through-$700_0$-n (n+1 elements).

A set of queue parameters as hereafter described is typical to the TDQ cached table 700 and is included in every element. Hence, the description is limited to one element $700_0$-0, which is representative of all the others. The queue parameters are information needed for processing the entry records in the transient data queue(s) which are stored in the TD-file(s). Element $700_0$-0 is set up to include queue parameters such as a region-ID 704, a file creation time-stamp 706, a transient data queue name (labeled as TDQ-ID) 702, and other relevant information. Element $700_0$-0 is set up to include the following additional queue parameters 708: a COSS name (labeled as TDQ-server); a transient data queue location (labeled as TDQ-location) which points to the data processing machine, a directory, a sub-directory and a TD-file name; and an open TD-file handle (labeled as TDQ-filename). It should be readily apparent that these lists are not exhaustive and that other parameters are relevant and may be included as well.

C. Use of the COSSs

Advantageously, the incorporation of the TDP aspect into the COSS functionality in combination with the above enumerated additional parameters facilitate the freedom of access to the customer information resource and, particularly, the transient data queue from any address space within the LC-CICS region. Moreover, although all the TDPs initiated by a particular COSS time-share its cached tables, maintaining a copy of the DCT and SIT in the internal cache memory of each COSS lessens contention for resources among the COSSs within the LC-CICS region and contributes to the overall efficiency of the loosely coupled data processing system.

During runtime, data processing applications call EXEC-CICS and, particularly, EXEC-CICS -TDQ for performing queue read, write and delete functions. These function calls include passing parameters such as TDQ-ID 702, data-length and region-ID 704. These parameters are used to find the entry record with a matching TDQ-ID 702.

In order to find an entry record in a transient data queue within a particular file, a TDQ cached table look-up is initiated in the corresponding cached table. The TDQ cached table look-up involves, in this case, indexing to locate one of the sixteen linked lists $700_{0, 1, ... 15}$. As implemented, indexing selects the particular linked list by concatenating the TDQ-ID 702 with the region-ID (also known as the SYSID) 704 and then performing a modulo-16 division. It should be understood that other look-up methods may be used without departing from the scope and spirit of the present invention.

Once the proper linked list $700_{0, 1, \ldots, 15}$ is located, it is searched for an element $700_{0, 1, \ldots, 15}\text{-}0, 1 \ldots$ containing a matched TDQ-ID 702. Assuming that a match is found, this element contains the additional queue parameters 708—that is, the corresponding TDQ-server, TDQ-location and TDQ-filename—which indicate the location of the transient data queue and particular record entry. Obtaining the location allows the called function to proceed with its read/write/delete operation. If no match is found, the next element in the linked list is examined, and so on.

Figure 8:
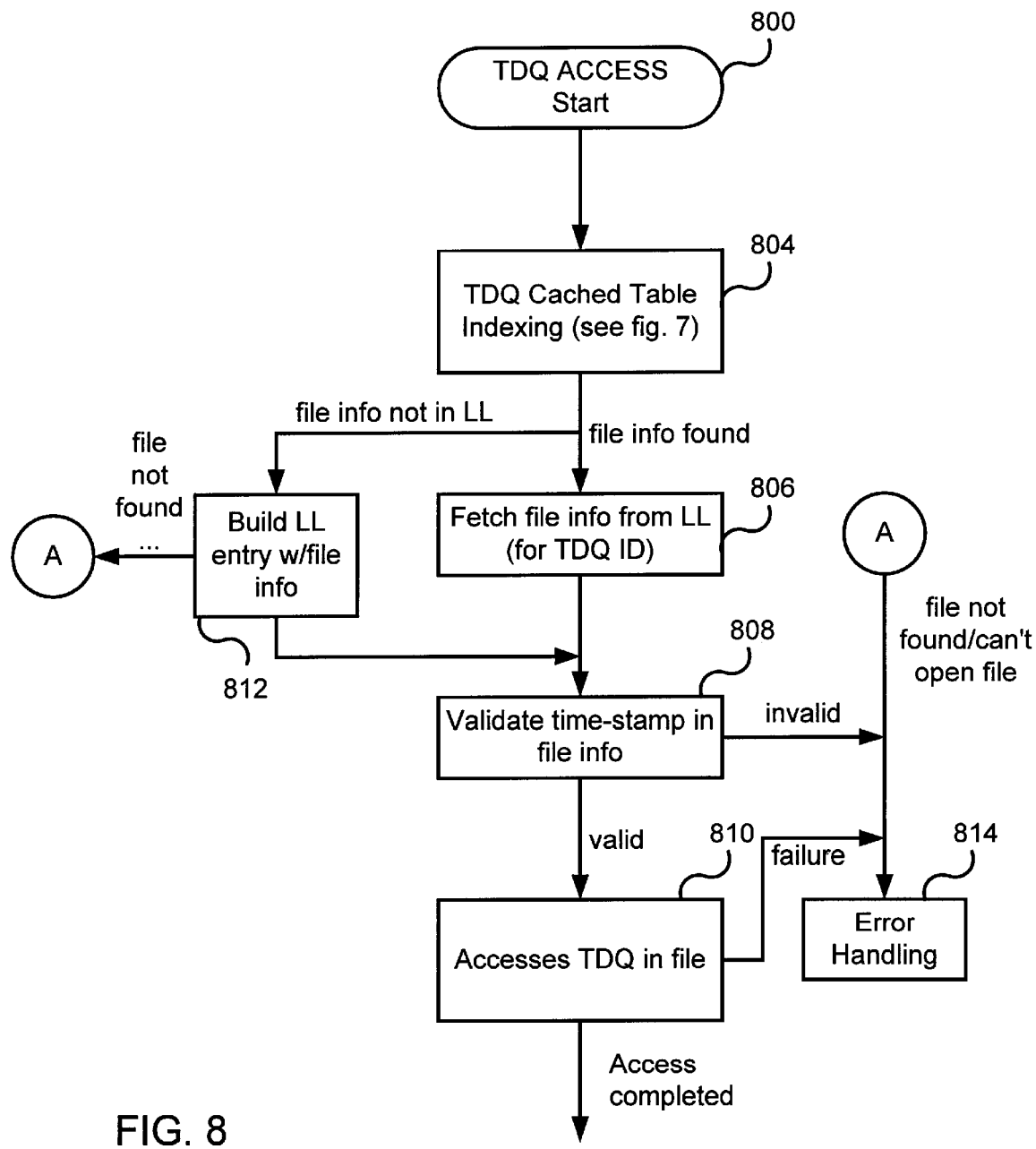
FIG. 8 is a flow diagram of the process to find and access a transient data queue in a TD-file.

FIG. 8 provides a flow diagram of the steps taken to find and access a transient data queue in a TD-file. The process starts via step 800 and proceed with a TDQ cached table, indexed as described above, via step 804. Once found, the TD-file information—that is, the corresponding set of queue parameters —is fetched from the linked list, via step 806.

If the linked list is exhausted and no matching TDQ-ID has been found, corresponding TD-file information does not exist in the TDQ cached table. In that case, a linked list element is added to the linked list, via step 812. This element will likewise include a set of queue parameters including the open TD-file handle, the related time-stamp and other relevant information as described above with respect to FIG. 7. If the TD-file cannot be found or opened, error handling is commenced via step 814.

If the TD-file information is successfully found and fetched, the file creation time-stamp 706 (FIG. 7) is then validated via step 808. If valid, the TD-file information is current and the TD-file may be accessed, via step 810. Conversely, if this time-stamp 706 is invalid, the TD-file information is no longer current because, for example, the TD-file has been relocated to another location in the LC-CICS region. In this case, the file information in the linked list element cannot be used to access the TD-file. Instead, an error or fault handling is performed, via step 814.

D. Moving a TD-File

It is noted that a TD-file may be relocated within the LC-CICS region in response to a command from the system administrator through one of the terminals. A system administrator may choose, for example, to relocate a TD-file to a less active data processing machine address space to render the response time more favorable. To that end, utilization level is typically logged and available for monitoring by the system administrator. A TD-file may also automatically relocate in response to a threshold or timed event as defined in the configuration file.

Once a TD-file is relocated (reopened in a different location with a new file creation time-stamp), the DCT entry for it is no longer valid and needs to be updated by the proxy-COSS. Thus, the proxy-COSS handles runtime configuration updates to updates the DCT, and notifies all COSSs (and the terminal routing process, if applicable), to update their cached tables either partly or completely. Flushing and updating of cached tables occurs at a number of granularity levels including: linked list element in a specific COSS; an entire cached table in a specific COSS; all cached tables in a specific COSS; and all cached tables in the LC-CICS region.

E. The Process of Accessing and Building a TDQ Cached Table

Figure 9A:
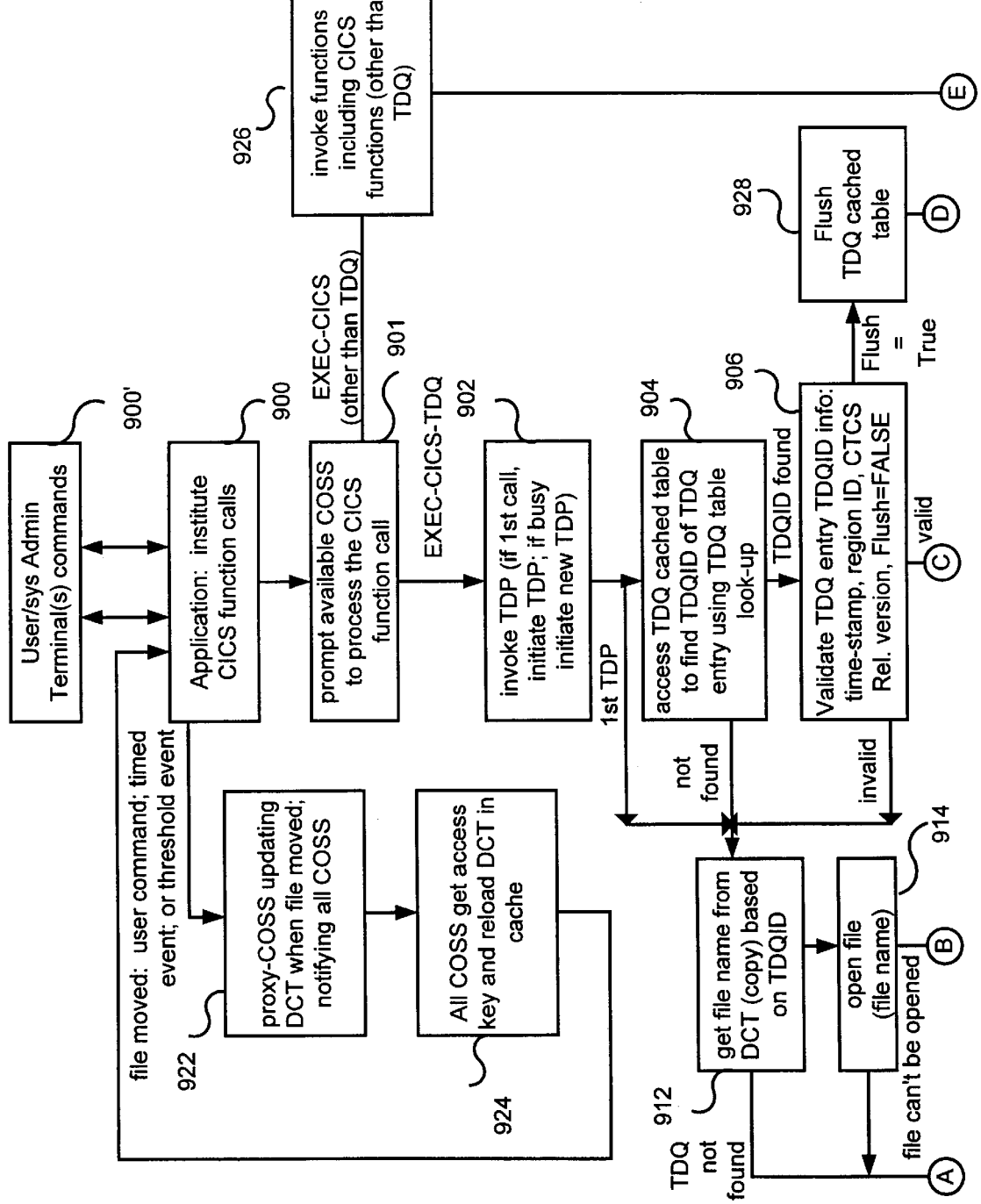
FIGS. 9A and 9B are a detailed flow diagram of the process of accessing and building the transient data queue cached tables.
Figure 9B:
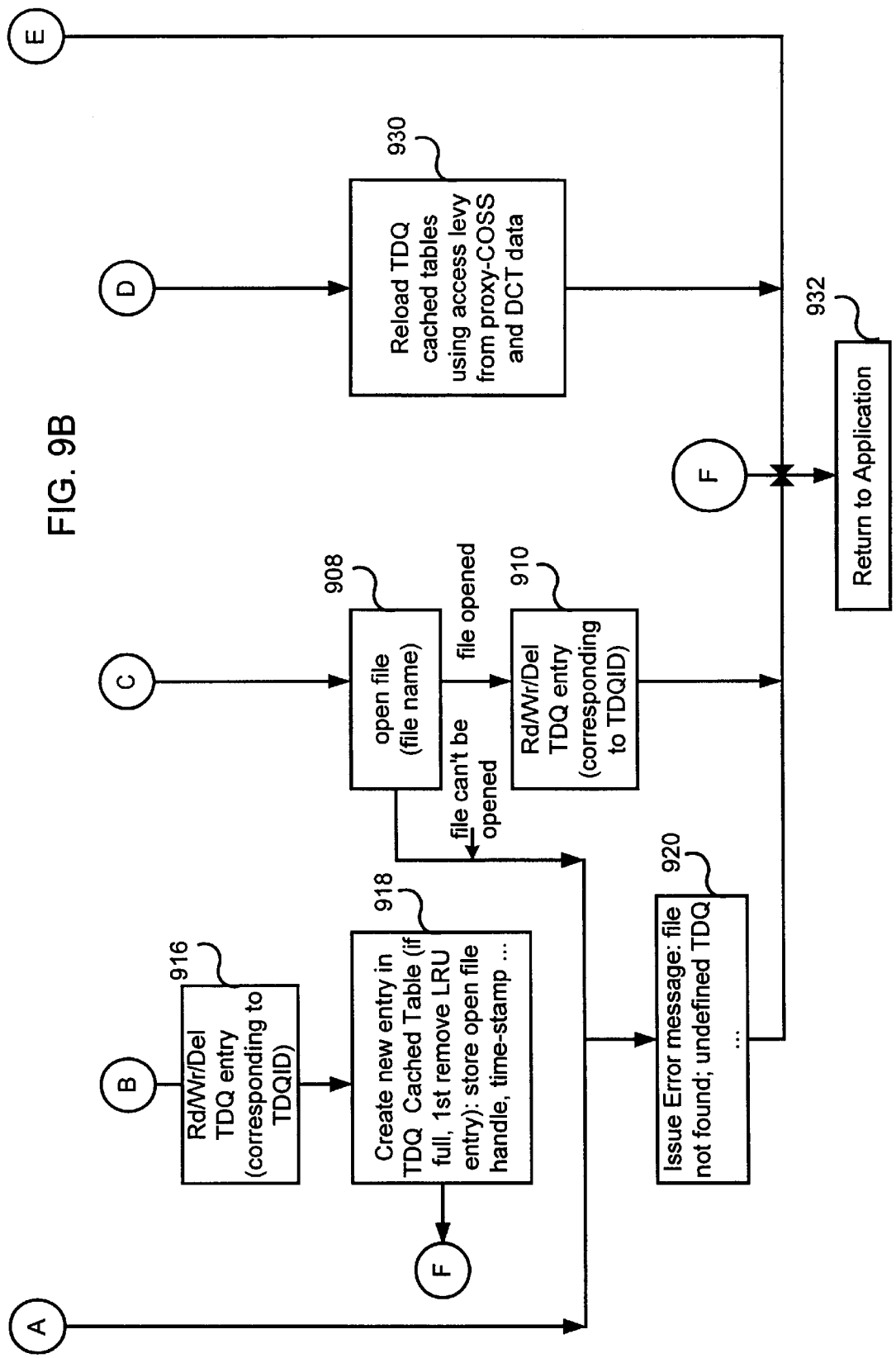

FIGS. 9A and 9B provide a detailed flow diagram of the process of accessing and building a TDQ cached table as well as performing configuration updates during runtime. During operation, after the initialization has been completed, one or more customer information control application programs are actively running. Each of these application programs responds, among others, to menu selection commands instituted by a user and/or system administrator, via step 900'. In turn, each of these application programs institutes function calls including EXEC-CICS calls that are either EXEC-CICS-TDQ or other than EXEC-CICS-TDQ, via step 900. In response, corresponding COSSs are prompted to service the function calls, via step 901.

For EXEC-CICS function calls other than EXEC-CICS-TDQ, the COSS proceeds to performs a CICS function as required, wherein this function is one of the suite of functions furnished in the COSS, via step 926. Then the process returns to the particular application program, via step 932.

For EXEC-CICS-TDQ function calls, the COSS responds with a number of steps as hereafter described. First, the COSS invokes a TDP via step 902.

As before mentioned, a TDP is a special software process for handling EXEC-CICS-TDQ function calls in a LC-CICS region in accordance with the invention. The TDP employs a scheme, preferably a caching scheme, suitable for the loosely coupled data processing environment of the loosely coupled CICS region.

If the DTP has not been previously initiated or if the TDP previously initiated is busy handling another EXEC-CICS-TDQ function call, the COSS initiates a new TDP, also via step 902. If this is the first TDP being initiated, the TDQ cached table is empty (except for the header). In this case the cached copy of the DCT table is used in order to locate the proper TD-file starting with step 912. If this is not the first TDP, however, the process continues via step 904 in which a TDQ cached table look-up as explained above is performed. The purpose of the look-up is to find a linked list element within the TDQ cached table that has a matching TDQ-ID.

Assuming that such an element exists in the TDQ cached table and the look-up process is successful, the queue parameters therein are then accessed and validated via step 906. For example, if the time-stamp does not match the corresponding DCT time-stamp, this means that the element contains an outdated set of queue parameters which cannot be used and must be first updated, starting with step 912. Additionally, if the region-ID, the CICS release version do not match to the corresponding DCT information, or a "flush"-bit is true, this means that this element must be flushed and replaced with an updated version thereof via steps 928 and 930. Otherwise, once loaded, queue parameters are not removed from the cached table unless it becomes full and one or more elements become stale. Stale elements are removed from a linked list of a TDQ cached table to make room for new elements.

Assuming at this point that the queue parameters are valid and current, they are used to locate and open the TD-file via step 908. If the TD-file cannot be found or opened, error handling is commenced via step 920 and the process returns to the corresponding customer information control application of step 900, via step 932. If the TD-file is successfully opened, via step 908, the read, write or delete queue function proceeds, via step 910. Thereafter, the process returns to the corresponding customer information control application of step 900, via step 932.

In order to build a new element in the linked list, after verifying that room is available or after making room available therein, a file name corresponding to the TDQ-ID passed with the EXEC-CICS-TDQ function call is fetched from the DCT. If none of the DCT-records contains a match for the TDQ-ID, an error or fault handling process in commenced, via step 920. Conversely, if a match is found, the TD-file listed in the DCT-record is opened, via step 916. A failure to open this TD-file results in commencement of error handling, also via step 920. However, if the TD-file is successfully opened, the read, write or delete function proceeds, via step 916, unless the record entry is missing or defective and error handling is performed instead, via step 920.

Assuming that the TD-file has been successfully opened and that the read, write or delete function has been successfully performed, the TD-file handle, time-stamp and related information provide the set of parameters to be stored in the new element of the linked list. As before mentioned, the decision to remove stale elements to make room for new ones is based on the least recently used (LRU) factor. Thereafter, the process returns to the corresponding customer information control application, via step 932.

It is noted, that the above process assumes that the DCT is current. If however, the DCT is not current, the COSS must obtain a new access key from the proxy-COSS and with it obtain access to the configuration file to copy an updated version of the DCT. A DCT is not current if, for example, DT-files are relocated and receive a new time-stamp. As illustrated, when a file is moved by a command from the system administrator or it automatically relocates when a pre-determined threshold or timed event occurs, the proxy-COSS updates the configuration parameters including updating the DCT in the configuration file as well as in its internal cache, via step 922. The proxy-COSS also notifies the other COSSs to flush and update their cached tables accordingly, via step 922. As a result, all COSSs obtain an access key from the proxy-COSS and reload their cached tables with copies of the DCT and SIT information from the configuration file, via step 924. This process may interrupt the ongoing application or it may time-share the data processing machine resources with the ongoing application.

Finally, if a particular transient data queue is configured for automatic task initiation (ATI) threshold processing, the TDP within a particular COSS queries a subset of record entries in this queue to determine if the pre-determined threshold has been reached. If so, the TDP sends an I/O message to the proxy-COSS to prompt an appropriate first customer information control application-defined action.

In addition, a timed event is possible wherein the respective TDP sends an I/O message to the proxy-COSS requesting it to start a count-down on a timer 618 as shown in FIG. 6. The initial value of the timer 618 is stored in the DCT. Once the count-down completes, the proxy-COSS is caused to initiate a second customer information control application-defined action, similar or different from the first. It is noted that this timed event process is not similar to a standard interval control which uses timers to start tasks or terminals.

In any event, if as a result of the threshold or timed event a TD-file is relocated, resized, deleted or created, the proxy-COSS proceeds with updating the various global parameters and with notifying the other COSSs as mentioned before, via step 922.

In summary, the present invention incorporates in each COSS a functionality which, in addition to the CICS functions, includes a caching scheme employed by a TDP for handling EXEC-CICS-TDQ function calls in order to render the LC-CICS region more flexible and easily manageable. With this approach a transient data resource such as the TD-file can be accessed by a COSS from anywhere within the LC-CICS region, regardless of whether the transient data resource is static or dynamically allocated.

F. SUMMARY

Other embodiments should be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for implementing a customer information control system (CICS) application programming interface (API), with transient data queue functions, in a data processing environment, the method comprising the steps of:

implementing a loosely coupled CICS region in the data processing environment, the loosely coupled CICS region including at least two of a plurality of machines and their respective address spaces;

providing at least one CICS-API operating system server (COSS) within the loosely coupled CICS region, each COSS operating in one of the at least two address spaces within the loosely coupled CICS region;

providing an information resource within the loosely coupled CICS region, the information resource including a file for holding a transient data queue; and providing a suite of functions including the transient data queue functions in each COSS, each COSS being capable of coordinated interaction with any other COSS within the loosely coupled CICS region, and each COSS being able to directly access the transient data queue from anywhere in the loosely coupled CICS region irrespective of which address space the COSS is operating in, wherein there is no affinity between the address space in which each COSS is operating and the address space being occupied by the transient data queue, and wherein the information resource is shared by each COSS.

2. A method according to claim 1, wherein each COSS utilizes cached tables to directly access the transient data queue from anywhere in the loosely coupled CICS region, the cached tables for holding information such as a set of transient data queue parameters, a maximum size of the cached tables, and a plurality of records each of which being associated with a queue-identification.

3. A method according to claim 1, wherein each COSS invokes at least one transient data process that handles the transient data queue utilizing a scheme to facilitates the direct access to the information resource from anywhere in the loosely coupled CICS region.

4. A method according to claim 3, wherein the scheme is a caching scheme, and wherein each transient data process utilizes cached tables including a first table for maintaining a set of transient data queue parameters which are instrumental in locating the transient data queue from anywhere in the loosely coupled CICS region.

5. A method according to claim 4, wherein the first table is a transient data queue cached table.

6. A method according to claim 4, wherein the cached tables include a second table containing a maximum size of the cached tables which dictates a maximum space allocated for each of the cached tables.

7. A method according to claim 5, wherein the second table is a system initialization table.

8. A method according to claim 4, wherein the cached tables include a second table containing records each including fields such as a header, a queue-identification, a file name and a time-stamp, and wherein for a plurality of queue-identifications the second table has a record for each queue-identification.

9. A method according to claim 8, wherein the second table is a destination control table.

10. A method according to claim 8, wherein at least one of the records further includes a timer value for timed events count-down.

11. A method according to claim 1, wherein the data processing environment comprises a loosely coupled data processing system environment.

12. A method according to claim 1, wherein the data processing environment comprises a loosely coupled parallel processing system environment.

13. A method according to claim 1, wherein the coordinated interaction is asynchronous.

14. A method according to claim 1, wherein the plurality of machines are loosely coupled.

15. A method according to claim 1, wherein the functionality of each machine is managed by a processor.

16. A method according to claim 1, wherein the functionality of each machine includes a multithreaded operating system capable of supporting a plurality of applications including customer information control applications.

17. A method according to claim 16, wherein each COSS operates under the respective multithreaded operating system and is, itself, a multithreaded operating system capable of supporting the plurality of customer information control applications.

18. A method according to claim 1, wherein the transient data queue functions are prompted by transaction requests issued during customer information control applications runtime, and wherein the transient data queue functions include read, write and delete.

19. A method according to claim 18, wherein each transient data process is invoked for handling the transient data queue functions in response to the respective transaction requests.

20. A method according to claim 1, wherein the file comprises a transient data file.

21. A method according to claim 1, wherein the file is set up to include at least one transient data queue each of which being associated with a set of queue parameters.

22. A method according to claim 21, wherein each transient data queue comprises a group of sequentially grouped commonly named record entries containing customer information, the common name being a unique key such as the queue-identification defined by a corresponding customer information control application.

23. A method according to claim 22, wherein each of the at least one transient data queues is created when a first record with the unique key is written to the file, and is removed when the transient data queue becomes empty.

24. A method according to claim 1, wherein the method further includes the step of:
initializing the loosely coupled CICS region.

25. A method according to claim 24, wherein at least one COSS is a proxy-COSS, and wherein the initializing step further includes the steps of:
initializing the proxy-COSS; and
initializing each remaining COSS.

26. A method according to claim 25, wherein the loosely coupled CICS region includes a configuration file which contains an access key, and tables of parameters which set the metes and bounds of the loosely coupled CICS region such as a destination control table and a system initialization table.

27. A method according to claim 26, wherein the proxy-COSS initializing step further includes the steps of:
creating each file named in the destination control table;
allocating a space in its internal cache memory for cached tables; and
creating a copy of the system initialization table and the destination control table in a second and third of the cached tables, respectively, a first table receiving a header and otherwise being initially empty.

28. A method according to claim 26, wherein the initializing of each remaining COSS, further includes the steps of:
allocating a space in its internal cache memory for cached tables;
obtaining the access key from the proxy-COSS; and
using the access key to gain access to the configuration file and copy therefrom the contents of the system initialization table and the destination control table into a second and third of the cached tables, respectively, a first table receiving a header and otherwise being initially empty.

29. A method for implementing a customer information control system (CICS) application programming interface (API), with transient data queue functions, in a data processing environment, the method comprising the steps of:
allocating an address region in the data processing environment, the address region being divided among a plurality of machines each of which defining an address space;
implementing a loosely coupled CICS region in the data processing environment, the loosely coupled CICS region including at least two of the plurality of machines and their respective address spaces;
providing at least one CICS-API operating system server (COSS) within the loosely coupled CICS region, each COSS operating in one of the plurality of address spaces within the loosely coupled CICS region;
providing an information resource within the loosely coupled CICS region, the information resource including a file for holding a transient data queue;
providing a suite of functions including the transient data queue functions in each COSS, each COSS being capable of coordinated interaction with any other COSS within the loosely coupled CICS region, each COSS being capable of carrying out a caching scheme utilizing cached tables by activating at least one transient data process for handling the transient data queue functions via the cached tables; and
initializing the loosely coupled CICS region in which each COSS is able to directly access the transient data queue from anywhere irrespective of which address space the COSS is operating in,
wherein there is no affinity between the address space in which each COSS is operating and the address space being occupied by the transient data queue, and wherein the information resource is shared by each COSS.

30. A method according to claim 29, wherein the caching scheme includes:
allocating a space for the cached tables, the cached tables including a first, a second and a third table, the first table for receiving transient data queue parameters, the second table for receiving system initialization table parameters and the third table for receiving destination control table parameters, the maximum size of each of the cached tables being stored in the second table;

responding to transient data function calls by:
  performing a first table look-up for finding an element having a matching queue-identification;
  validation information in the element if found, including a time-stamp for verifying that a file handle is current and can be used to access the transient data queue in that file;
  building a new element in the first table, if an element with the matching queue identification is not found, by fetching the file information from a record in the third table which has a matching queue identification, obtaining the file handle, and storing the file handle and related information in the new element;
  performing one of a read, write and delete functions on the transient queue within the file; and
  commencing error handling based on occurrence of a failure in one of the foregoing 1–4 steps; and
returning to a corresponding application which runs under the particular COSS.

31. A method according to claim 30, wherein the error handling is a result of failures such as one of a file not found, a file cannot be opened, a queue identification not found, and queue parameters invalid.

32. A method according to claim 30, wherein the first table includes at least one linked list each of which being set up to contain a plurality of elements, each element including queue parameters such as a particular queue identification, time-stamp and file handle, and wherein the first table look-up step includes:
  an indexing for locating one of the linked lists; and
  a linked list search for finding an element with the particular queue identification that matches a queue identification passed with the transient data function call.

33. A method according to claim 32, wherein the indexing utilizes the passed queue identification and a CICS region identification for locating a selected linked list in the first table.

34. A system for providing a customer information control system (CICS) application programming interface (API), with transient data queue functions in, a data processing environment, the system comprising:
  a loosely coupled CICS region, the loosely coupled CICS region including at least two of a plurality of machines and their respective address spaces;
  at least one CICS-API operating system server (COSS) within the loosely coupled CICS region, each COSS operating in one of the at least two address spaces within the loosely coupled CICS region;
  an information resource within the loosely coupled CICS region, the information resource including a file for holding a transient data queue; and
  a suite of functions including the transient data queue functions provided in each COSS, each COSS being capable of coordinated interaction with any other COSS within the loosely coupled CICS region, and each COSS being able to directly access the transient data queue from anywhere in the loosely coupled CICS region irrespective of which address space the COSS is operating in,
  wherein there is no affinity between the address space in which each COSS is operating and the address space being occupied by the transient data queue, and wherein the information resource is shared by each COSS.

35. A system according to claim 34, in which each COSS being configured to utilizes cached tables for directly accessing the transient data queue from anywhere in the loosely coupled CICS region, the cached tables for holding information such as a set of transient data queue parameters, a maximum size of the cached tables, and a plurality of records each of which being associated with a queue-identification.

36. A system according to claim 34, in which each COSS being configured to invokes at least one transient data process that handles the transient data queue utilizing a scheme to facilitates the direct access to the information resource from anywhere in the loosely coupled CICS region.

37. A system according to claim 36, wherein the scheme is a caching scheme such that each transient data process utilizes cached tables including a first table for maintaining a set of transient data queue parameters that are instrumental in locating the transient data queue from anywhere in the loosely coupled CICS region.

38. A system according to claim 37, in which the cached tables include a second table containing a maximum cached table size which dictates a maximum space allocated for each cached table.

39. A system according to claim 37, in which the cached tables include a second table containing records each including fields such as a header, a queue-identification, a file name and a time-stamp, the third table having a record for each queue-identification.

40. A system according to claim 39, wherein at least one of the records further includes a timer value for timed events count-down.

41. A system according to claim 34, wherein the data processing environment comprises a loosely coupled data processing system environment.

42. A system according to claim 34, wherein the data processing environment comprises a loosely coupled parallel processing system environment.

43. A system according to claim 34, wherein the coordinated interaction is asynchronous.

44. A system according to claim 34, in which the plurality of machines are loosely coupled.

45. A system according to claim 34, in which the functionality of each machine is managed by a processor.

46. A system according to claim 34, in which the functionality of each machine includes a multithreaded operating system capable of supporting a plurality of applications including customer information control applications.

47. A system according to claim 34, in which each COSS operates under a respective multithreaded operating system and is, itself, a multithreaded operating system capable of supporting a plurality of customer information control applications.

48. A system according to claim 34, in which the transient data queue functions are prompted by transaction requests issued during the customer information control applications runtime, and wherein the transient data queue functions include read, write and delete.

49. A system according to claim 34, in which the file comprises a transient data file.

50. A system according to claim 49, in which the file is set up to include a plurality of transient data queues each of which being associated with a set of queue parameters.

51. A system according to claim 50, in which each transient data queue comprises a group of sequentially grouped commonly named record entries containing customer information, the common name being a unique key such as the queue-identification defined by a corresponding customer information control application.

52. A system according to claim 51, wherein each of the at least one transient data queues is created when a first record with the unique key is written to the file, and is removed when the transient data queue becomes empty.

53. A system according to claim 34, in which the loosely coupled CICS region is being initialized.

54. A system according to claim 34, in which at least one COSS is a proxy-COSS including cached tables such that the proxy-COSS loads its cached tables with parameters setting the metes and bound of the loosely coupled CICS region, the proxy-COSS further providing to each remaining COSS an access key for obtaining the parameters and storing them in their respective cached tables and for subsequently using them in a caching scheme.

55. A system according to claim 54, in which the proxy-COSS is a COSS pair including a primary proxy-COSS and a backup proxy-COSS which takes over when the primary proxy-COSS fails.

56. A system according to claim 54, in which the parameters are included in a configuration file, and wherein the parameters include parameter tables such as a destination control table and a system initialization table.

57. A system according to claim 56, in which the proxy-COSS is further capable of:
creating each file named in the destination control table;
allocating a space in its internal cache memory for the cached tables based on a size value specified in the system initialization table; and
creating a copy of the system initialization table and the destination control table in a first and second of its cached tables, respectively.

58. A system according to claim 56, in which each remaining COSS is further capable of:
allocating a space in its internal cache memory for the cached tables;
obtaining the access key from the proxy-COSS; and
using the access key to gain access to the configuration file and copy therefrom the contents of the system initialization table and the destination control table into a first and second of its cached tables, respectively, a third table receiving a header and otherwise being initially empty.

59. A computer readable medium including program instructions executed in a data processing system environment for providing a customer information control system (CICS) application programming interface (API), with transient data queue functions, the program instructions for:
implementing a loosely coupled CICS region in a data processing environment, the loosely coupled CICS region including at least two of a plurality of address spaces, each associated with a machine;
providing at least one CICS-API operating system server (COSS) within the loosely coupled CICS region, each COSS operating in one of the at least two address spaces within the loosely coupled CICS region;
providing an information resource within the loosely coupled CICS region, the information resource including a file for holding a transient data queue; and
providing a suite of functions including the transient data queue functions in each COSS, each COSS being capable of coordinated interaction with any other COSS within the loosely coupled CICS region, and each COSS being able to directly access the transient data queue from anywhere in the loosely coupled CICS region irrespective of which address space the COSS is operating in,
wherein there is no affinity between the address space in which each COSS is operating and the address space being occupied by the transient data queue, and wherein the information resource is shared by each COSS.

60. A computer readable medium including program instructions executed in a data processing system environment for providing a customer information control system (CICS) application programming interface (API), with transient data queue functions, the program instructions for:
allocating an address region in the data processing system environment, the address region being divided among a plurality of machines each of which defining an address space;
implementing a loosely coupled CICS region in the data processing system environment, the loosely coupled CICS region including at least two of the plurality of machines and their respective address spaces;
providing at least one CICS-API operating system server (COSS) within the loosely coupled CICS region, each COSS operating in one of the plurality of address spaces within the loosely coupled CICS region;
providing an information resource within the loosely coupled CICS region, the information resource including a file for holding a transient data queue;
providing a suite of functions including the transient data queue functions in each COSS, each COSS being capable of coordinated interaction with any other COSS within the loosely coupled CICS region, each COSS being capable of carrying out a caching scheme utilizing cached tables by activating at least one transient data process for handling the transient data queue functions via the cached tables; and
initializing the loosely coupled CICS region in which each COSS is able to directly access the transient data queue from anywhere irrespective of which address space the COSS is operating in,
wherein there is no affinity between the address space in which each COSS is operating and the address space being occupied by the transient data queue, and wherein the information resource is shared by each COSS.

61. A computer readable medium according to claim 60, wherein the caching scheme includes:
allocating space for the cached tables, the cached tables including a first, a second and a third table, the first table for receiving transient data queue parameters, the second table for receiving system initialization table parameters and the third table for receiving destination control table parameters, the maximum size of each of the cached tables being stored in the second table;
responding to transient data function calls by:
performing a first table look-up for finding an element having a matching queue-identification;
validation information in the element if found, including a time-stamp for verifying that a corresponding file handle is current and can be used to access the transient data queue in that file;
building a new element in the first table, if an element with the matching queue identification is not found, by fetching the file information from a record in the third table which has a matching queue identification, obtaining the file handle, and storing the file handle and related information in the new element;

performing one of a read, write and delete functions on the transient queue within the file;

commencing error handling based on occurrence of a failure in one of the foregoing 1–4 steps; and returning to a corresponding application which runs under the particular COSS.

* * * * *